United States Patent

Adams et al.

(10) Patent No.: US 6,748,175 B1
(45) Date of Patent: Jun. 8, 2004

(54) OPTICAL RING NETWORK HAVING ENHANCED SECURITY AND REDUCED LOSS

(75) Inventors: Laura Ellen Adams, Basking Ridge, NJ (US); Jon Anderson, Brielle, NJ (US); Robert Mario Broberg, San Francisco, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/333,409

(22) Filed: Jun. 15, 1999

(51) Int. Cl.[7] ............................ H04B 10/20; H04J 14/02
(52) U.S. Cl. ............................ 398/82; 398/58; 398/59; 398/83
(58) Field of Search ................... 359/118, 119, 359/124, 125, 127; 398/58, 59, 60, 68, 70, 83, 82

(56) References Cited

U.S. PATENT DOCUMENTS

| | | | | |
|---|---|---|---|---|
| 5,576,875 A | * | 11/1996 | Chawki et al. | 359/119 |
| 5,825,949 A | | 10/1998 | Choi et al. | 385/24 |
| 5,852,505 A | * | 12/1998 | Li | 359/118 |
| 6,233,074 B1 | * | 5/2001 | Lahat et al. | 359/118 |
| 6,233,221 B1 | * | 5/2001 | Lowe et al. | 370/222 |
| 6,285,478 B1 | * | 9/2001 | Liu et al. | 359/122 |
| 6,348,984 B1 | * | 2/2002 | Mizrahi | 359/124 |
| 6,426,815 B1 | * | 7/2002 | Koehler | 359/119 |

FOREIGN PATENT DOCUMENTS

| | | | | |
|---|---|---|---|---|
| WO | WO9852314 | 11/1998 | | H04J/14/02 |
| WO | WO9912268 | 3/1999 | | |

* cited by examiner

*Primary Examiner*—Leslie Pascal
*Assistant Examiner*—Dzung Tran

(57) ABSTRACT

A fiber-optic WDM ring carries communication traffic among a plurality of nodes, each node associated with respective subscriber premises. The WDM ring includes an optical add-drop module (OADM) at each node for adding and dropping signals associated with that node. The WDM ring also includes active terminal equipment at each node for conditioning incoming and outgoing data and for converting between the optical and electrical domains. The OADM at each of at least some nodes, to be referred to as enhanced nodes, is situated at a site physically separated from the powered terminal equipment, and is coupled to the powered terminal equipment via an optical medium. At each enhanced node, traffic not destined for that node is routed through no more than one enclosure on subscriber premises that requires a connection. If there is such enclosure, it contains the OADM.

12 Claims, 4 Drawing Sheets

OPTICAL RING NETWORK HAVING ENHANCED SECURITY AND REDUCED LOSS

FIELD OF THE INVENTION

The present invention relates generally to optical networking, and, more particularly, to installations in which a WDM ring carries short-haul communications.

BACKGROUND OF THE INVENTION

There is currently a market need, experienced by, for example, telephone carriers and cable operators, to provide short-haul transmission of internet protocol (IP) packets among interconnected nodes that are typically spaced apart by about 20 km or less. Proposed systems use an IP packet over SONET interface, and use wavelength-division multiplexing (WDM) to carry the packets on an optical fiber transmission medium.

One particular class of architectures for the short-haul network is the class of ring architectures. Such architectures are especially useful for serving business parks, campuses, military bases, networks of geographically dispersed company buildings, and the like. Typically, a pair of counter-propagating fiber-optic rings connects a plurality of nodes, disposed along the ring, with a hub. The hub manages inbound and outbound transmissions between the ring and external communication networks. Each node typically serves one subscriber or aggregate of subscribers, which by way of illustration could be an office suite in an urban office building.

At each node, the ring is typically routed through an electronics cabinet where the received traffic for that node is extracted from the ring, and the transmitted traffic for that node is injected into the ring. The handling of such traffic, generally in the electrical domain, is typically carried out by a conventional packet data shelf, conjoined with a transceiver for performing conversions between the optical and electrical domains.

Between nodes, it is often possible to house the ring components within underground pipes or tunnels, or the like. However, to reach a node, it is often necessary to route the ring components from floor-to-floor within an office building, or to otherwise expose the ring to easier access. Such an arrangement has at least two disadvantages.

One disadvantage is that routing through a building is typically achieved by relaying all of the ring traffic from one patch panel to another as the ring rises or descends from floor to floor within the building. There is loss associated with each patch-panel connection. This loss is cumulative over all of the nodes through which the affected traffic passes. Each subscriber is penalized by the losses suffered not only in reaching its own node, but also in reaching each node through which that subscriber's traffic passes.

A second disadvantage is that as it enters and exits a node, the ring may suffer reduced reliability and security, because it is more exposed to accidental disturbances as well as to deliberate tampering.

SUMMARY OF THE INVENTION

We have developed a dual-ring, bidirectional optical fiber transmission system that interconnects a plurality of nodes with a hub, such that multiple WDM channels are established on each ring.

An illustrative such system is described briefly below. Further details of the illustrative system can be found in the copending application of L. Adams, J. Anderson, W. Brinkman, and R. Broberg, filed on Jun. 15, 1999 under the title "Wideband Optical Packet Ring Network," and assigned to the same assignee as the present invention.

Although the invention is not so limited, it is particularly useful when a relatively wide spacing of the channels, exemplary a spacing on the order of 10–30 nm, and more typically about 20 nm, enables the use of very low cost transceivers and avoids the need for temperature control. Such a WDM system is often referred to as a coarse WDM (CWDM) system.

At each node, an optical add-drop module (OADM) comprises dielectric thin film filters (TFFs) arranged to (a) extract, for the purposes of a receiver, or (b) insert, for the purposes of a transmitter, information in one or more of the channels. In particular, this type of filter is well suited to accommodate the wavelength drift normally associated with temperature changes in the laser transceivers if they are uncooled.

We have observed that such use of TFFs in a C-WDM system offers a further advantage. Because the wavelength tuning of TFFs is generally highly humidity-stable and is relatively stable over a wide temperature range, and because the relatively large width of C-WDM channels can, in any event, accommodate significant amounts of temperature drift, the use of these filters relaxes the need to maintain the OADMs in a temperature-controlled environment, or even in an environment limited to habitable temperatures. In view of this, we have recognized, for the first time, that the OADM can be removed from the electronics cabinet that houses, e.g., the pertinent node's packet processor. Instead, it can be placed physically nearer the less accessible portions, e.g., the underground portions, of the ring. This makes it possible to extract the traffic arriving for each node and to route solely the extracted traffic through the building where the pertinent subscriber is located. This exempts the traffic belonging to other subscribers from the patch-panel losses and public exposure suffered by the instant subscriber's traffic.

Thus, in one aspect, the invention is a fiber-optic WDM ring for carrying communication traffic among a plurality of nodes, each node associated with respective subscriber premises. The WDM ring includes an OADM at each node for adding and dropping signals associated with that node. The WDM ring also includes powered terminal equipment at each node for conditioning incoming and outgoing data and for converting between the optical and electrical domains. The OADM at each of at least some nodes, to be referred to as enhanced nodes, is situated at a site physically separated from the powered terminal equipment, and is coupled to the powered terminal equipment via an optical medium. At each enhanced node, traffic not destined for that node is routed through no more than one enclosure on subscriber premises that requires a connection. If there is such enclosure, it contains the OADM.

DETAILED DESCRIPTION

Our invention is useful generally in WDM ring networks that use TFFs for channel selection. We have developed a particular such network in respect to which the present invention is usefully employed. For illustrative purposes, our network is now described with reference to FIG. 1.

We have developed a dual-ring, bidirectional optical fiber transmission system that interconnects a series of nodes, e.g., nodes 110–116, with a hub 130, such that multiple, widely spaced coarse WDM channels are established on the respective unidirectional rings 101, 102. Typically, a relatively wide spacing of the channels, on the order of 20 nm, enables the use of inexpensive transceivers and avoids the need to control the temperature of transceiver components such as semiconductor lasers. At each node, there is an optical add-drop module that includes TFFs arranged to (a) extract, for the purposes of a receiver, or (b) insert, for the purposes of a transmitter, information in one or more of the channels. This type of filter is well suited to accommodate the wavelength drift normally associated with temperature changes in uncooled lasers.

A channel passband of 13 nm with a channel spacing of 20 nm is typical. An exemplary range of channel passbands useful in this context is 5–20 nm.

Further discussion of TFFs can be found in the copending application of L. Adams, J. Anderson, R. Broberg and G. Lenz, filed on Jun. 15, 1999 under the title "Optical Add-Drop Module With Low Loss And High Isolation" and assigned to the same assignee as the present invention. Very briefly, a TFF is made by depositing alternating layers of two or more dielectric materials on a suitable substrate, such as optical glass. TFFs, and TFF devices, are commercially available from several suppliers, including Optical Corporation of America, 170 Locke Drive, Marlborough, Mass., and ETEK Dynamics, Inc., 1885 Lundy Avenue, San Jose, Calif.

The signals in the one or more channels are coupled to the TFFs in each node by a standard optical transceiver, which performs modulation and demodulation. Each filter passband can be populated with multiple dense wavelength division multiplexed (D-WDM) channels, so that the capacity of traffic that can be handled at each node can be easily upgraded. The transceiver is, in turn, coupled to an IP packet over SONET framer, which supplies received IP packets to, and receives outgoing EP packets from, a conventional Layer 3 routing engine.

Because of the advantageous use of TFFs in the OADMs, simple lasers can be used in the fiber-optic transmission system, so that there is no requirement for thermoelectric coolers or heat sinks, the power dissipation is reduced, and the hubs and nodes can be of smaller size than currently available. Furthermore, the architecture is such that a pay-as-you-grow approach can be used, wherein the capacity between a pair of nodes may be increased by adding channels, without affecting other nodes on the ring.

Figure 1:
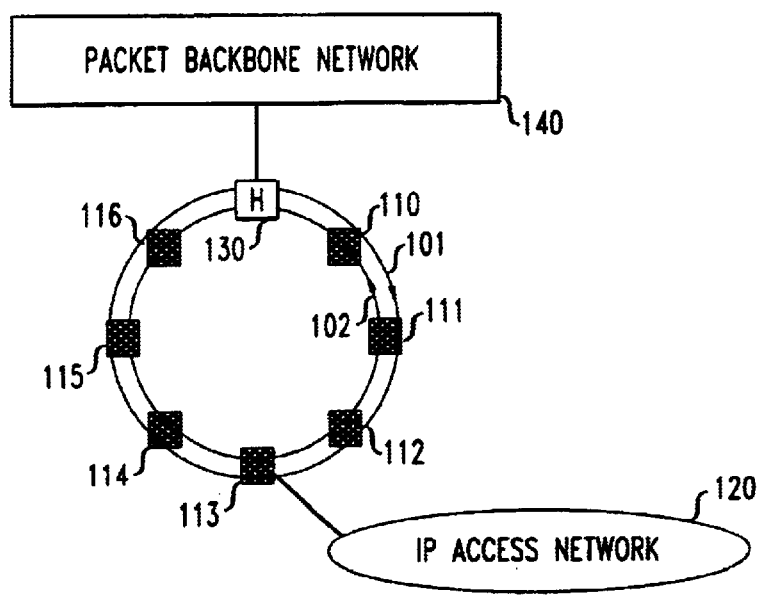
FIG. 1 is a block diagram of a dual-ring, bi-directional fiber-optic transmission system arranged to interconnect a plurality of nodes with a hub.

Hub 130 is connected to a managed IP backbone network 140. The transmission system of FIG. 1 is effective to route IP packets, typically using the SONET interface and protocol, from backbone network 140 to destinations that are interconnected to the system via other access networks, such as the IP access network 120 shown coupled to. node 113, and vice versa (i.e., from users connected to access network 120 to backbone network 140). IP access network 120 may be a PathStar IP switch available from Lucent Technologies Inc. of Murray Hill, N.J.

Figure 2:
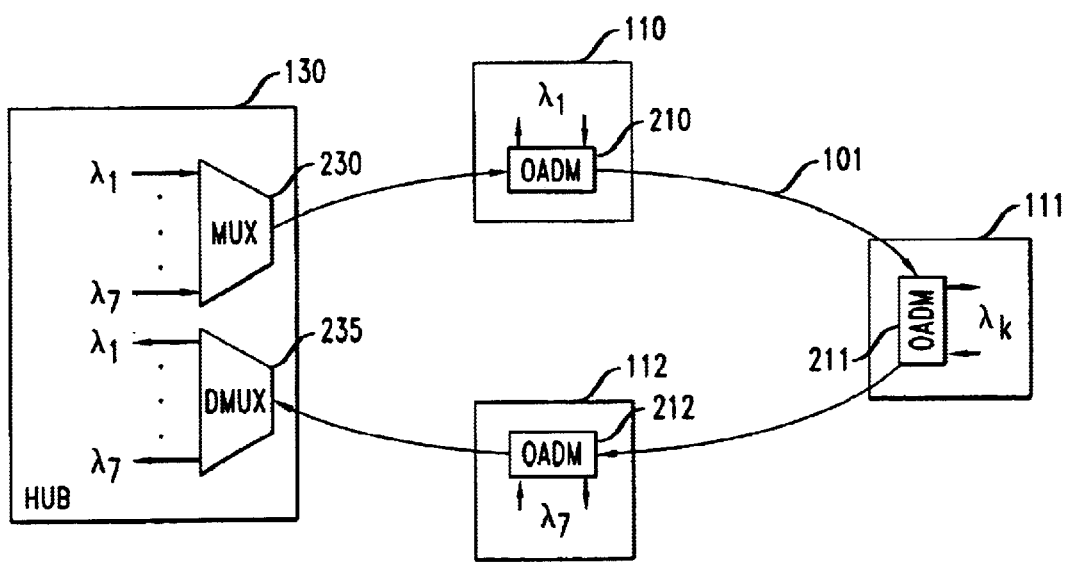
FIG. 2 is a block diagram showing one of the optical transmission rings of FIG. 1, including expanded detail of the hub and some of the nodes.

Turning now to FIG. 2, ring 101 is shown interconnecting nodes 110–112 with hub 130. Ring 101 is shown as transmitting packets from node to node in the clockwise direction. Each of the nodes 110–112 includes a respective OADM 210–212, in which TFFs are respectively, arranged to (a) extract from the wavelength division multiplexed signals present on ring 101, only those signals in a specific wavelength band, corresponding to a widely spaced WDM channel, and (b) insert signals back onto ring 101 in the same specific wavelength band and WDM channel. Thus, as seen in FIG. 2, OADM 210 in node 110 is tuned to wavelength $\lambda_1$, OADM 211 in node 111 is tuned to wavelength $\lambda_k$, and TFF 212 in node 112 is tuned to wavelength $\lambda_7$, it being assumed in this example that there are a total of seven WDM channels available on ring 101.

In hub 130, incoming information packets are applied to ring 101 via multiplexer 230, and outgoing information packets are extracted from ring 101 via demultiplexer 235. Multiplexer 230 and demultiplexer 235 are connected to the originating and terminating ends, respectively, of ring 101. These elements may, e.g., be part of a PacketStar W-WDM LiRIC available from Lucent Technologies, Inc. In the embodiment illustrated, multiplexer 230 receives packets carried in seven separate input streams, each stream representing an individual WDM channel $\lambda_1$ to $\lambda_7$. The individual inputs are combined into a single WDM signal and applied touring 101. Similarly, demultiplexer 235 receives the WDM signal on ring 101, separates the combined signal into seven separate output streams, and applies the output streams to suitable decoding apparatus.

Figure 3:
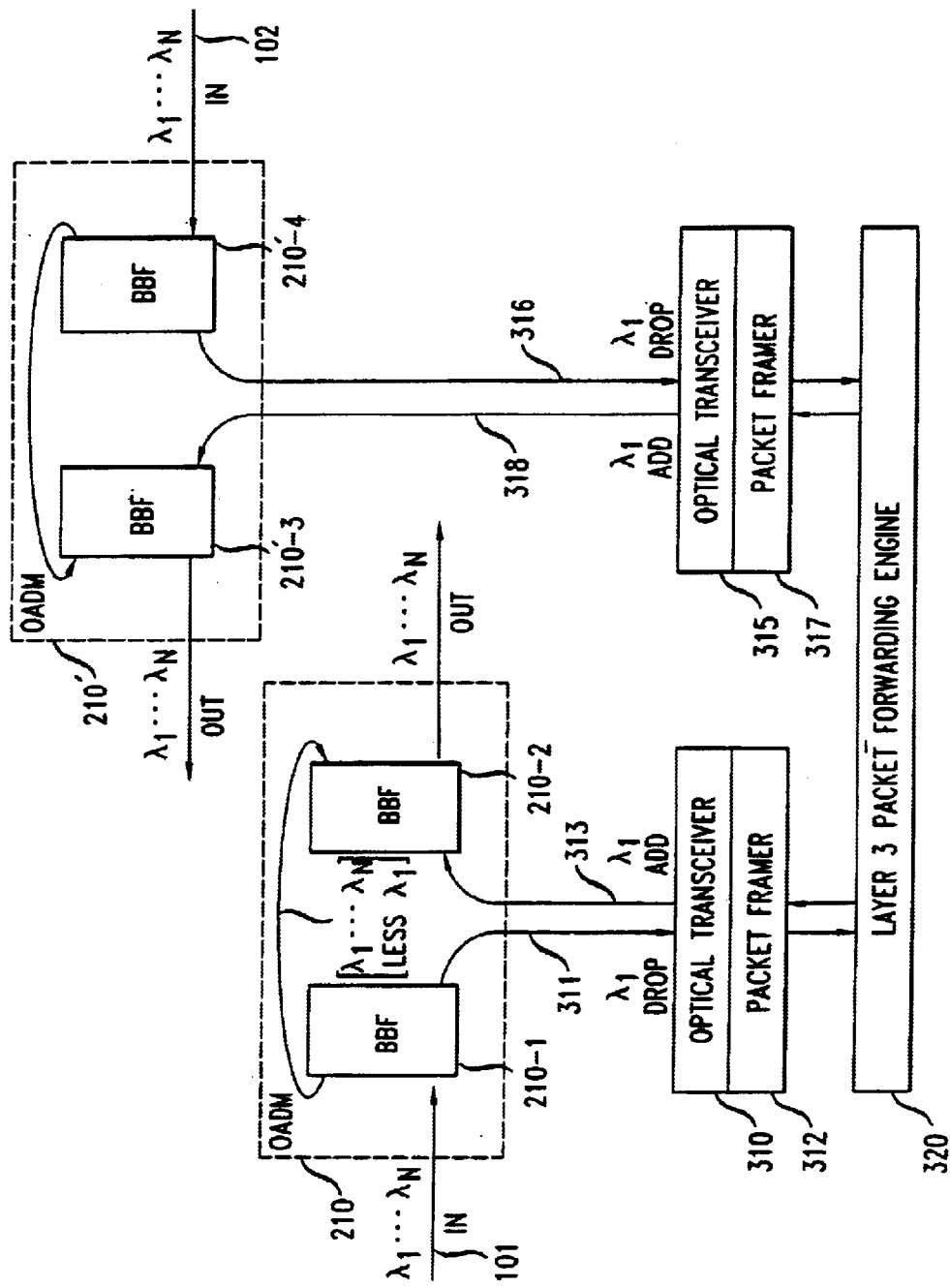
FIG. 3 is an expanded block diagram of an exemplary node from the transmission system of FIG. 1.

FIG. 3 is a block diagram showing the arrangement of one of the nodes of FIGS. 1 and 2, but in more detail. In FIG. 3, ring 101, which circulates packets in a clockwise (left to right in FIG. 3) direction, applies signals in multiple WDM channels $\lambda_1$ to $\lambda_N$ to OADM 210, which is shown in FIG. 3 as having two distinct broadband filters, namely an extraction (drop) filter 210-1 and an insertion (add) filter 210-2. The function of TFF drop filter 210-1 is to separate from the combined signals received at the node, only those signals in one of the WDM channels $\lambda_1$. These signals are applied, via downstream connection 311, to the receiver portion of a standard optical transceiver 310, which is arranged to demodulate the information portion of the packets from the carrier portion, and apply the information packets to a packet framer 312 (such as a TDAT STS-1/12c packet framer), which implements a packet over SONET conversion algorithm. The output of framer 312 is applied to a layer 3 packet forwarding engine 320, which may be a PacketStar IP switch that is part of IP access network 120 in FIG. 1.

In the reverse or upstream direction, IP packets received from forwarding engine 320 in packet framer 312 are converted from IP format to packet over SONET format, and applied to the transmitter portion of optical transceiver 310 to modulate a laser having a nominal wavelength $\lambda_j$, associated with a particular WDM channel. The output of transceiver 310 is applied via upstream connection 313 to the insertion filter 210-3 of the OADM, and thus combined with the signals being transmitted out of the node on ring 101.

A similar arrangement is used in OADM 210' which is a part of ring 102, where information packets are carried in the counterclockwise (right to left in FIG. 3) direction. As noted previously, the dual ring arrangement illustrated in FIGS. 1 and 3 allows ring capacity expansion and protection in the case of a ring fault. Here, the OADM 210' includes an extraction (drop) filter 210'-4 and an insertion (add) filter 210'-2. The output of extraction filter 210'4 is coupled via downstream connection 316 to the receiver portion of optical transceiver 315. The packets output from transceiver 315 are converted to IP format in packet framer 317 and applied to IP forwarding engine 320. With respect to the upstream direction, IP packets from forwarding engine 320 are converted to SONET protocol in packet framer 317, and applied to the transmitter portion of optical transceiver 315. The output of transceiver 315 is coupled via upstream connection 318 to insertion filter 210'-3 of the OADM 210'.

In typical installations, the optical ring network, including both unidirectional rings, is emplaced underground in, e.g., a tunnel, pipe, or armored cable, except where it is brought up to, or where it enters, a subscriber's building. We will use the term "common area" to refer to those geographical areas of network emplacement that are not associated with any particular subscriber, and we will use the term "subscriber premises" to refer to those areas that are associated with one or more particular subscribers. Thus, subscriber premises include a building that houses one or more particular subscribers, and also include any area that is traversed in order to deliver traffic to a building in which one or more particular subscribers are located. The portion of the network that approaches a subscriber's building is often deployed in a less secure manner than it is in the common area, because, e.g., it is buried more shallowly or even passes through an overhead line.

Figure 4:
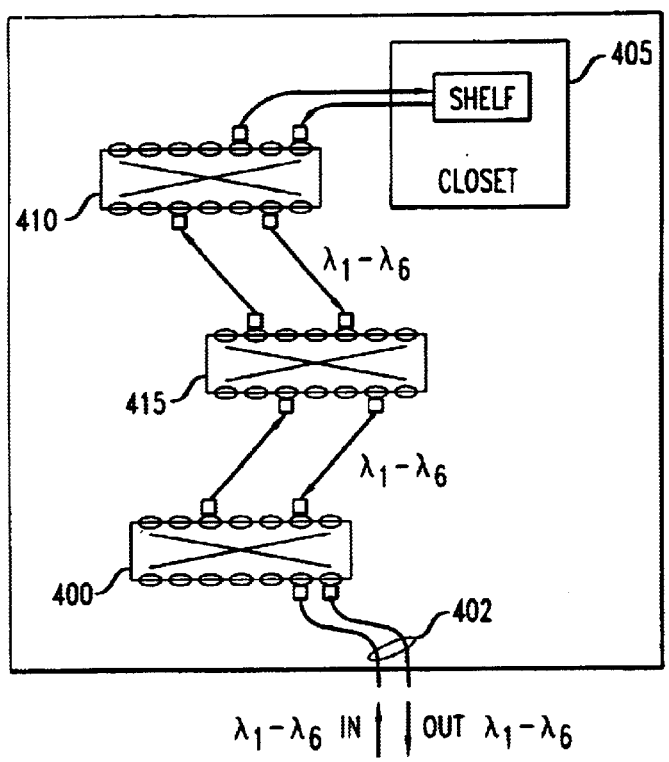
FIG. 4 is a schematic diagram showing a conventional method for routing an optical ring network through an illustrative office building.

Near its point of entry into a subscriber's building, the network cable typically passes through a junction box or patch panel located, e.g., on the ground floor of the building. We will use the term "junction box" to refer to any enclosure within which optical fiber connections are made. Turning to FIG. 4, such a junction box for the entering network cable 402 is shown as box 400. The network of FIG. 4 has six subscribers, each assigned a respective wavelength channel having one of center wavelengths $\lambda_1$–$\lambda_6$. Electronics cabinet 405, which houses the subscriber's OADM, optical transceiver, packet framer, and, e.g., layer 3 router and related electronics are situated on the subscriber's floor of the building, or, e.g., on an upper floor of the building dedicated to communication equipment. Connection between box 400 and cabinet 405 is typically made by passing the cable from floor to floor through a series of patch panels, such as boxes 410 and 415 of FIG. 4.

Conventional ring-network installations, as described above, suffer several disadvantages. One disadvantage is that on the subscriber premises, the cable is less secure, and is more susceptible to accidental damage and deliberate tampering, than it is in the common area. This is particularly true within buildings. It should be noted in this regard that each subscriber's traffic will not only be routed from floor-to-floor through that subscriber's building, but also through every other subscriber's building. Although a security-conscious subscriber might be able to control access to the patch panels in its own building, it would generally be unable to exert such control within other buildings. Thus, such a subscriber would have cause for concern over the exposure of its traffic to mishap and to tampering.

A second disadvantage is that there is loss associated with each cable connection. In typical installations, this will often add up to 1.5 dB, or even 2.5 dB or more, per node. Since there will typically be 5–10 nodes in the network, it will be appreciated that every subscriber can suffer 10 dB of loss, or even more, simply as a result of the patch-panel connections.

Figure 5:
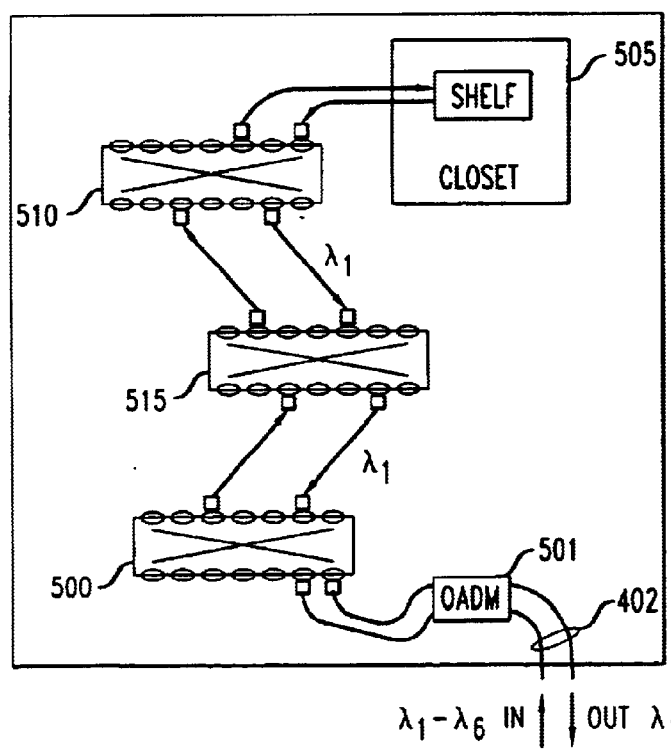
FIG. 5 is a schematic diagram showing a method, according to the invention in one embodiment, for routing a portion of optical network traffic through the illustrative office building of FIG. 4.

Our solution is to remove the OADM from electronics cabinet 405, and instead, to place it nearer the common area of the network installation. For example, as shown in FIG. 5, we situate OADM 501 within, or adjacent to, junction box 500 which, like box 400 of FIG. 4, is the first junction box encountered by cable 402 upon entry to the building. As shown in FIG. 5, the pertinent subscriber's wavelength channel has center wavelength $\lambda_1$. Thus, OADM 501 separates incoming traffic in this channel for routing to closet 505 through, e.g., patch panels 510 and 515. Outgoing traffic in this channel routed from closet 505 through patch panels 510 and 515 is injected back into cable 402 by OADM 501. FIG. 5 illustrates the case in which the channels-not destined for a given building experience no patch panel/junction box loss at that building, since the OADM precedes the junction box.

A result of our new approach is that each subscriber suffers loss from no more than one junction box at each building not its own. A further result is enhanced security, because each subscriber's traffic is routed from floor-to-floor only in that subscriber's building.

An important feature of our invention is the use of TFFs to perform the channel-selection function in the OADMs. The wavelength tuning of TFFs is highly insensitive to temperature and humidity, relative to other wavelength-selective devices. For example, temperature drift values of 0.001 nm per Celsius degree are typical of TFFs. For WDM networks in general, but especially for C-WDM networks, this renders it feasible to install the OADM in an environment that is not temperature-controlled. Such an environment may be, e.g., on the outside wall of a building, where temperatures may range from sub-freezing to over 40 degrees C. Such an environment may be in a basement or service area, near a furnace, boiler, or steam pipe. Moreover, the TFFs are passive devices, and therefore do not need monitoring. Thus, the OADM can be installed in an area that has limited accessibility, and it normally needs inspection only at long intervals, such as yearly intervals.

In fact, these properties of the OADM make it possible to install the OADM not only on a different floor from the subscriber's electronics cabinet, but even outside of the subscriber's building. For example, the OADM can be installed at the side of the curb, or at an above-ground or underground location on the subscriber's premises that lies between the common area and the subscriber's building. Alternatively, the OADM can be installed on or near a telephone pole, so that only the pertinent subscriber's traffic need be delivered from the pole to a building via an overhead cable.

Figure 6:
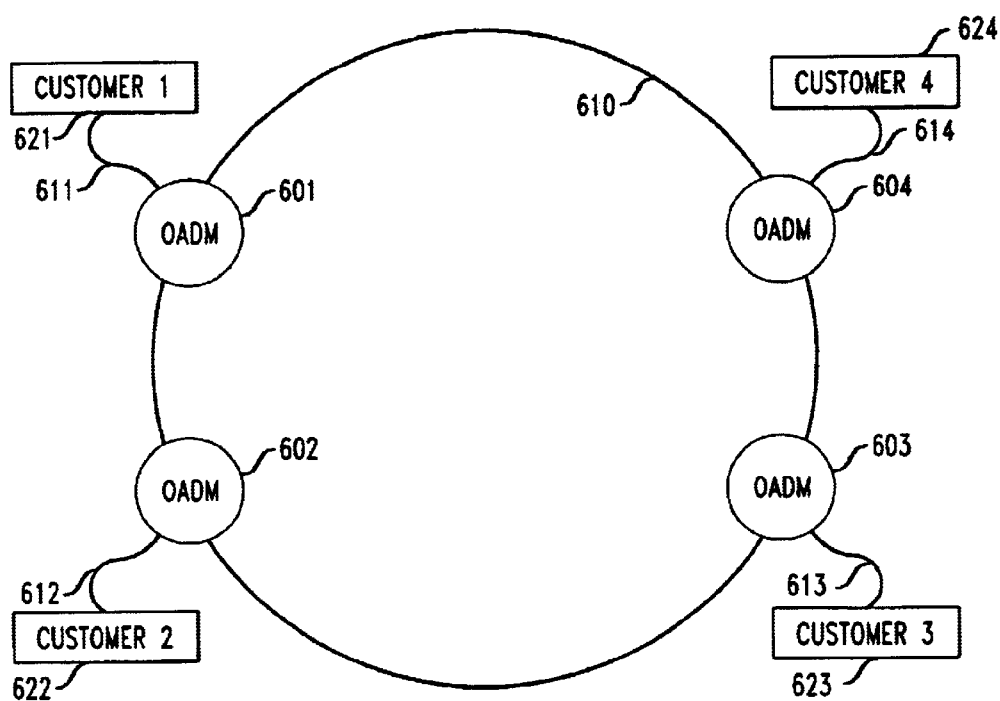
FIG. 6 is a conceptual diagram of an optical ring network, according to an alternate embodiment of the invention, in which an OADM associated with each of several nodes is made integral with a common ring.

Still further, the OADM can be installed within the common area of the network, so that only traffic to and from a given subscriber is brought onto such subscriber's premises. Access to such an OADM is conveniently made, e.g., through a manhole if the network is installed underground. Such accommodation can be made for one subscriber, some subscribers, or all subscribers of the network. In particular, as shown in FIG. 6, each of a plurality of OADMs, exemplarily OADMs 601–604 of the figure, can be made integral with a common ring 610. There will typically be respective rings circulating in opposite directions, but only one such ring is shown in the figure. From each OADM there radiates a respective one of node-specific cables 611–614, each carrying traffic on a respective wavelength channel to and from a respective one of subscribers 621–624.

While the preceding description of an embodiment of the present invention relates to an Internet Protocol (IP) network carrying IP packets, it is to be understood that the present invention can be used in connection with many diverse types of networks and with the transmission of different types of information bearing packets or signals. Thus, as used herein, the term "packets" includes, but is not limited to, data packets (such as are used in asynchronous transfer mode (ATM), synchronous transfer mode (STM), and/or internet protocol (IP) networks), as well as other information bearing signals, sometimes referred to as "frames", that are found, for example, in streaming audio and/or video applications.

The invention claimed is:

1. A communication network comprising:

a hub;

a plurality of nodes interconnected by at least one unidirectional fiber-optic WDM ring, wherein each node is associated with some subscriber premises;

an optical add-drop module (OADM) at each node for adding and dropping optical signals in a wavelength channel assigned to such node; and powered terminal equipment at each node for conditioning ingoing and outgoing communication traffic and for converting between optical and electrical signal domains;

wherein:

at one or more nodes, to be referred to as enhanced nodes, the corresponding OADM is situated at a location physically separated from the powered terminal equipment, and is coupled to the powered terminal equipment via an optical medium;

at each enhanced node, communication traffic not destined for that node is routed through no more than one enclosure on subscriber premises that requires a connection; and at each enhanced node, if communication traffic not destined for that node is routed through an enclosure on subscriber premises that requires a connection, such enclosure contains the OADM associated with that node.

2. The network of claim 1, wherein the OADM at each node comprises two or more thin-film filters.

3. The network of claim 1, wherein the WDM ring is adapted to carry communication traffic in a plurality of coarse-WDM wavelength channels having a channel spacing of at least 10 nm, but not more than 30 nm.

4. The network of claim 1, wherein at each enhanced node, the powered terminal equipment and the OADM are situated on different floors of a building.

5. The network of claim 1, wherein at each enhanced node, the powered terminal equipment is installed in the interior of a building, and the OADM is situated outside of the building.

6. The network of claim 5, wherein at least at one enhanced node, the OADM is situated underground.

7. The network of claim 5, wherein at least at one enhanced node, the OADM is situated on a telephone pole.

8. The network of claim 1, wherein:

said network passes through a common area that is not associated with any particular network subscriber;

said network also passes through subscriber premises associated with particular network subscribers; and at each enhanced node, the OADM location is nearer than the powered terminal equipment to the common area.

9. The network of claim 1, wherein:

said network passes through a common area that is not associated with any particular network subscriber;

said network also passes through subscriber premises associated with particular network subscribers; and at each enhanced node, the OADM location is within the common area.

10. The network of claim 1, wherein the OADM of at least one enhanced node is integral with the WDM ring, and there radiates from said OADM a cable carrying traffic only for the subscriber or subscribers associated with said enhanced node.

11. The network of claim 10, wherein said radiating cable passes through subscriber premises associated with said subscriber or subscribers, but the WDM ring does not pass through said subscriber premises.

12. The network of claim 1, wherein:

said network passes through a common area that is not associated with any particular network subscriber;

said network carries traffic that is to be delivered through subscriber premises associated with particular network subscribers;

the OADM of each node is integral with the WDM ring;

there radiates from each OADM a cable carrying traffic only for the subscriber or subscribers associated with the pertinent node, such that each said cable passes through subscriber premises; and the WDM ring, including the OADMs, is disposed only within the common area.

* * * * *